(12) United States Patent
Prel et al.

(10) Patent No.: US 11,307,097 B1
(45) Date of Patent: Apr. 19, 2022

(54) TECHNOLOGIES FOR HIGH RESOLUTION AND WIDE SWATH SPECTROMETER

(71) Applicant: ABB Schweiz AG, Baden (CH)

(72) Inventors: Florent M. Prel, Quebec (CA); Frederic J. Grandmont, Beaupre (CA); Louis M. Moreau, Quebec (CA); Eric A. Carbonneau, Quebec (CA); Martin C. Larouche, St-Apollinaire (CA)

(73) Assignee: ABB SCHWEIZ AG, Baden (CH)

( * ) Notice: Subject to any disclaimer, the term of this patent is extended or adjusted under 35 U.S.C. 154(b) by 9 days.

(21) Appl. No.: 17/069,020

(22) Filed: Oct. 13, 2020

(51) Int. Cl.
*G01J 3/453* (2006.01)
*G01J 3/28* (2006.01)
*G01J 3/45* (2006.01)

(52) U.S. Cl.
CPC .......... *G01J 3/4535* (2013.01); *G01J 3/2823* (2013.01); *G01J 2003/2826* (2013.01); *G01J 2003/452* (2013.01); *G01J 2003/4538* (2013.01)

(58) Field of Classification Search
CPC ................ G01J 3/4535; G01J 3/2823; G01J 2003/2826; G01J 2003/452; G01J 2003/4538
See application file for complete search history.

(56) References Cited

FOREIGN PATENT DOCUMENTS

| CN | 107271037 A | * 10/2017 |
|---|---|---|
| CN | 208012760 U | * 10/2018 |

* cited by examiner

*Primary Examiner* — Hwa Andrew Lee
(74) *Attorney, Agent, or Firm* — Armstrong Teasdale LLP

(57) ABSTRACT

Technologies for a high resolution and wide swath spectrometer are disclosed. In the illustrative embodiment, an inverted image slicer converts a linear field of view into a grid shape, allowing for an interferometer of a Fourier transform spectrometer to operate on a narrow range of field of views, improving the average spectral resolution of the spectrometer.

20 Claims, 6 Drawing Sheets

TECHNOLOGIES FOR HIGH RESOLUTION AND WIDE SWATH SPECTROMETER

BACKGROUND

Spectrometers may be used on satellites for various purposes such as weather forecasting. Fourier transform spectrometers may be used, but such spectrometers may have poor spectral resolution at wide angles. A moving element such as used in a whiskbroom configuration may be used to sweep across a range of viewing angles, but such an approach increases the cost and complexity of the spectrometer.

SUMMARY

According to one aspect of the present disclosure, a spectrometer comprises an inverted image slicer configured to accept input light to the spectrometer; an adjustable interferometer configured to accept light from the inverted image slicer; a sensor configured to sense light from the interferometer; wherein the inverted image slicer causes a linear field of view of the spectrometer to be imaged as a two-dimensional grid on the sensor.

In some embodiments of the spectrometer, the sensor is configured to sense a range of wavelengths, wherein the range of wavelengths includes 6.2 micrometers.

In some embodiments of the spectrometer, the sensor comprises a two-dimensional array of pixels, wherein data from each pixel of the two-dimensional array of pixels can be used to determine a spectrum of light imaged at that pixel with a resolution better than 2 cm-1.

In some embodiments of the spectrometer, the inverted image slicer converts a field of view with at least one dimension extending across at least 100 milliradians to a field of view with each dimension extending across less than 90 milliradians.

In some embodiments of the spectrometer, the sensor comprises a two-dimensional array of pixels, wherein each pixel images a field of view between 0.005 and 30 milliradians.

In some embodiments of the spectrometer, the inverted image slicer comprises a first lens to focus input light onto a first plurality of mirrors; the first plurality of mirrors, wherein each of the first plurality of mirrors is tilted at an angle different from each other of the first plurality of mirrors, wherein each of the first plurality of mirrors is configured to direct light from the first lens to a corresponding mirror of a second plurality of mirrors; the second plurality of mirrors, wherein each of the second plurality of mirrors is configured to direct light from the corresponding mirror of the first plurality of mirrors to a corresponding mirror of a third plurality of mirrors; the third plurality of mirrors, wherein each of the third plurality of mirrors is tilted at an angle different from each other of the third plurality of mirrors, wherein each of the third plurality of mirrors is configured to direct light from a corresponding mirror of the second plurality of mirrors to a second lens; and the second lens.

In some embodiments of the spectrometer, each of the second plurality of mirrors is configured to image a surface of the corresponding mirror of the first plurality of mirrors on a surface of the corresponding mirror of the second plurality of mirrors.

In some embodiments of the spectrometer, the interferometer comprises a beam splitter, a first mirror, and a second mirror, wherein each of the first mirror and the second mirror is a corner-cube mirror.

In some embodiments of the spectrometer, the interferometer is in a Michelson configuration.

According to another aspect of the present disclosure, a satellite comprises a spectrometer according to any of the embodiments described above, including any combination of any or all of the features described above.

According to yet another aspect of the disclosure, a method of using a spectrometer comprises gathering light into an inverted image slicer, the inverted image slicer configured to accept input light to the spectrometer; transmitting light from the inverted image slicer to an adjustable interferometer; and detecting light from the adjustable interferometer at a sensor, wherein the inverted image slicer causes a linear field of view of the spectrometer to be imaged as a two-dimensional grid on the sensor.

In some embodiments, the method may further include analyzing data from the sensor to determine a spectrum of the gathered light.

In some embodiments, the method may further include predicting the weather based on the spectrum of the gathered light.

In some embodiments of the method, the sensor is configured to sense a range of wavelengths, wherein the range of wavelengths includes 6.2 micrometers.

In some embodiments of the method, the sensor comprises a two-dimensional array of pixels, wherein data from each pixel of the two-dimensional array of pixels can be used to determine a spectrum of light imaged at that pixel with a resolution better than 2 cm-1.

In some embodiments of the method, the inverted image slicer converts a field of view with at least one dimension extending across at least 100 milliradians to a field of view with each dimension extending across less than 90 milliradians.

In some embodiments of the method, the inverted image slicer comprises a first lens to focus input light onto a first plurality of mirrors; the first plurality of mirrors, wherein each of the first plurality of mirrors is tilted at an angle different from each other of the first plurality of mirrors, wherein each of the first plurality of mirrors is configured to direct light from the first lens to a corresponding mirror of a second plurality of mirrors; the second plurality of mirrors, wherein each of the second plurality of mirrors is configured to direct light from the corresponding mirror of the first plurality of mirrors to a corresponding mirror of a third plurality of mirrors; the third plurality of mirrors, wherein each of the third plurality of mirrors is tilted at an angle different from each other of the third plurality of mirrors, wherein each of the third plurality of mirrors is configured to direct light from a corresponding mirror of the second plurality of mirrors to a second lens; and the second lens.

In some embodiments of the method, each of the second plurality of mirrors is configured to image a surface of the corresponding mirror of the first plurality of mirrors on a surface of the corresponding mirror of the second plurality of mirrors.

In some embodiments of the method, the interferometer comprises a beam splitter, a first mirror, and a second mirror, wherein each of the first mirror and the second mirror is a corner-cube mirror.

In some embodiments of the method, the spectrometer is on a satellite orbiting Earth.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
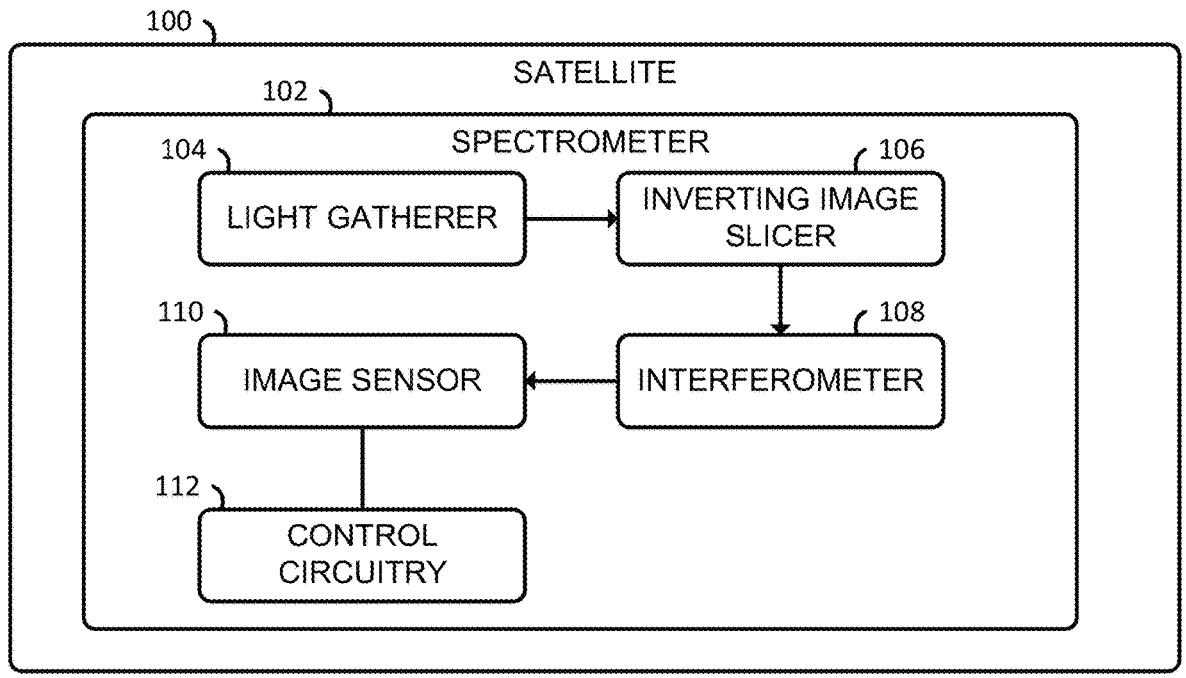
FIG. 1 is a simplified block diagram of a satellite including a spectrometer.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C): (A and B); (B and C); (A and C); or (A, B, and C). Similarly, items listed in the form of "at least one of A, B, or C" can mean (A); (B); (C): (A and B); (B and C); (A and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Figure 2:
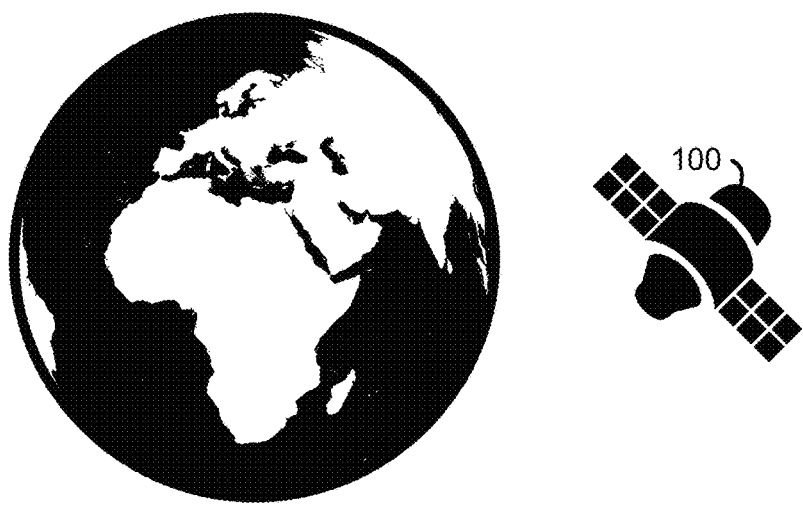
FIG. 2 is a simplified diagram of at least one embodiment of the satellite in FIG. 1 in orbit around the Earth.

Referring now to FIG. 1, a satellite 100 includes a spectrometer 102. The spectrometer 102 has a light gatherer 104, an inverted image slicer 106, an interferometer 108, an image sensor 110, and control circuitry 112. In use, the satellite 100 is in orbit around the Earth, as shown in FIG. 2. The spectrometer 102 is configured to monitor a spectrum of the atmosphere of the Earth below the satellite 100. The spectrometer 102 may have a relatively wide field of view across the track of the satellite 100 and a relatively narrow field of view along the track of the satellite 100. As the satellite 100 moves across its track, the wide across-track field of view sweeps out a wide swath of area that is monitored by the spectrometer 102. In the illustrative embodiment, the spectrometer 102 may be supported in a housing designed to withstand the extraterrestrial environment (e.g., an aluminum or stainless steel optical bench and cover).

The spectrometer 102 uses the inverted image slicer 106 to convert a linear field of view of the satellite into a grid, converting a field of view at the light gatherer 104 from, e.g., a horizontal field of view of 500 milliradians and a vertical field of view of 20 milliradians to an effective field of view at the interferometer 108 of 100 milliradians by 100 milliradians. The field of view of the light gatherer 104 may be any suitable field of view, such as 5 to 1,500 milliradians in the horizontal and/or vertical direction. It should be appreciated that labeling a particular field of view as horizontal and/or vertical is arbitrary and does not limit the orientation of the satellite 100, the spectrometer 102, or any other component. It should further be appreciated that the field of view is not necessarily rectangular. For example, the field of view may be an ellipse, a circle, a square, or any other suitable shape. In the illustrative embodiment, the field of view of the spectrometer 102 is defined by one or more apertures, pupils, acceptance angles, etc., of one or more of the components of the light gatherer 104. Additionally or alternatively, the field of view may be defined by another component of the spectrometer, such as the image that is created on the image sensor 110.

In the illustrative embodiment, the light gatherer 104 is a lens combined with an aperture to control the light entering the system. In some embodiments, the light gatherer 104 may be embodied as one or more mirrors, one or more lenses, one or more additional optics, and/or any combination of the above. By way of example, in some embodiments, the light gatherer 104 may comprise scanning or static folding mirrors to redirect a line of sight of spectrometer 102.

Figure 3:
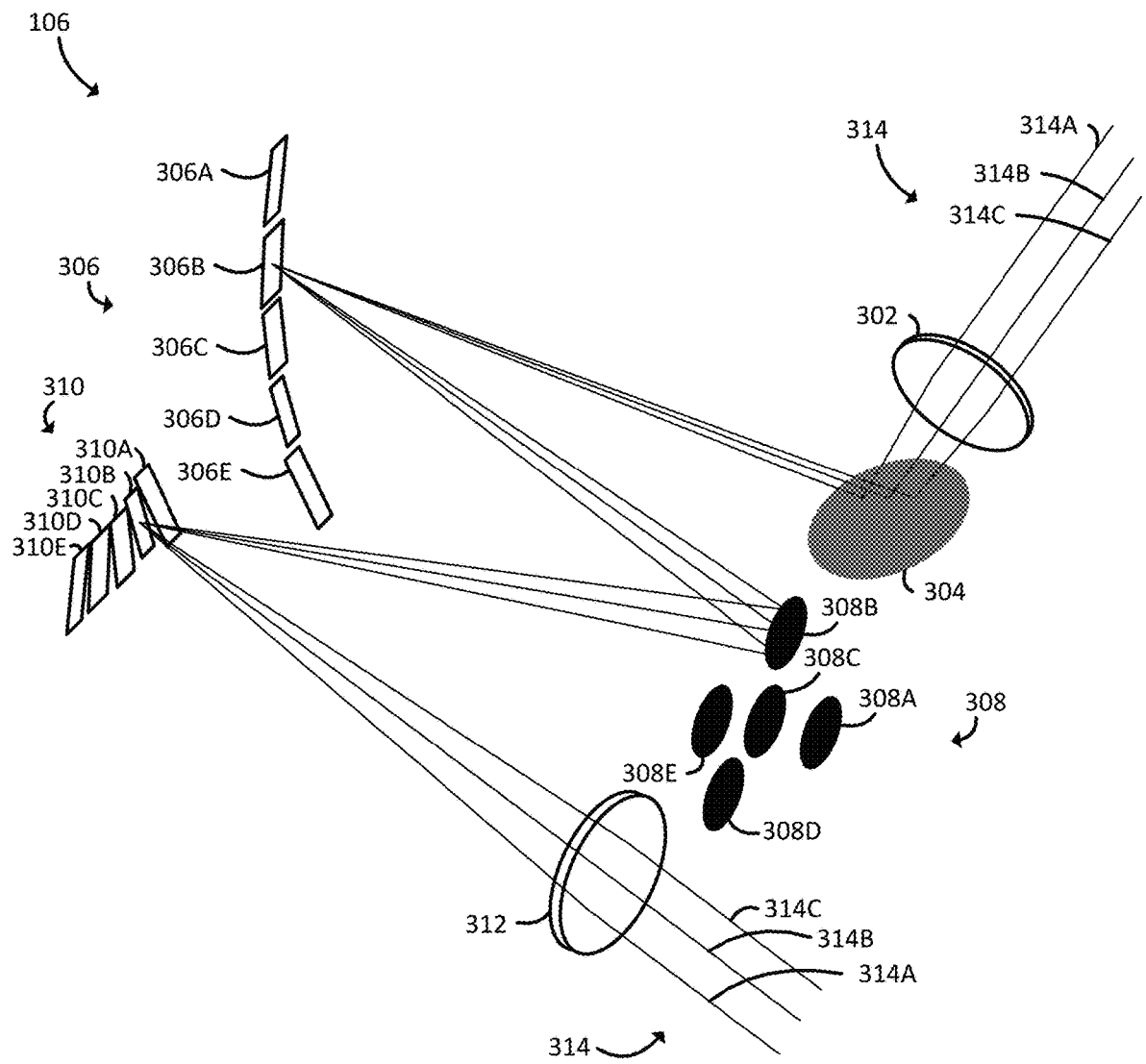
FIG. 3 is a simplified diagram of at least one embodiment of the inverted image slicer of FIG. 1.
Figure 4:
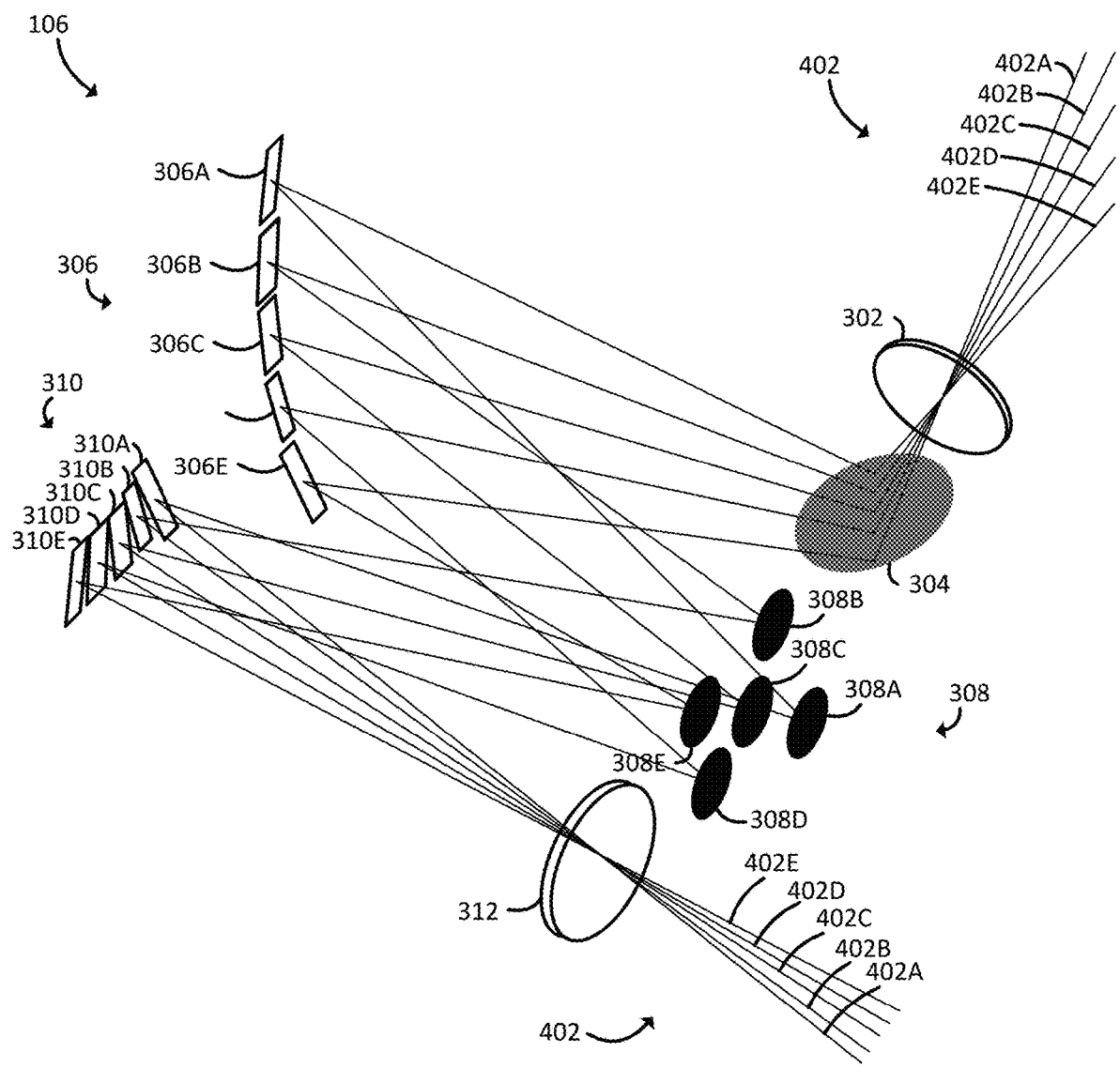
FIG. 4 is a simplified diagram of at least one embodiment of the inverted image slicer of FIG. 1.
Figure 5:
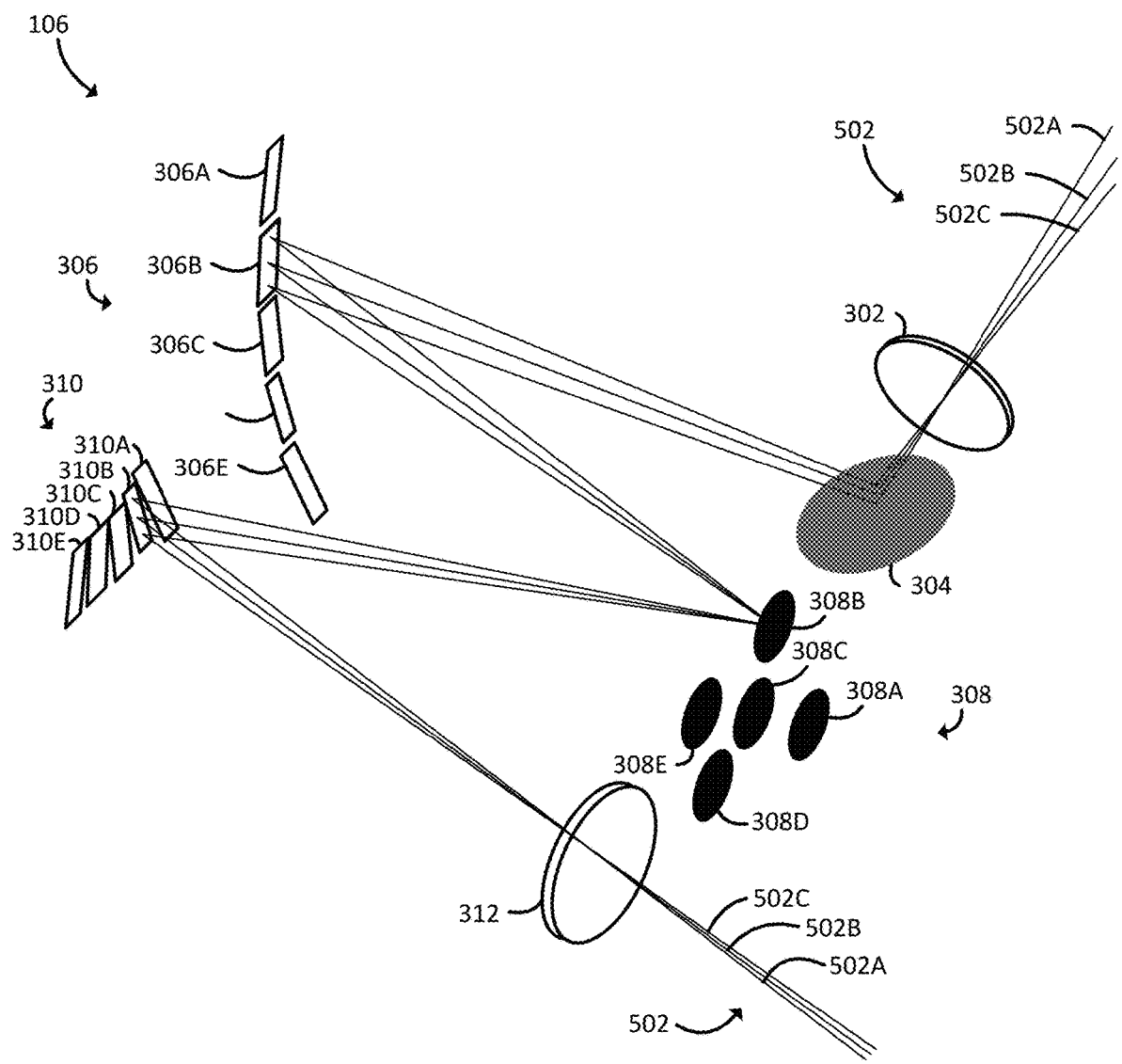
FIG. 5 is a simplified diagram of at least one embodiment of the inverted image slicer of FIG. 1.

The inverted image slicer 106 may be any suitable inverted image slicer 106 capable of performing the function described herein. One embodiment of the inverted image slicer 106 is described in more detail below in regard to FIGS. 3-5. However, it should be appreciated that the inverted image slicer 106 may be implemented in a different manner. For example, the inverted image slicer 106 may be implemented using one or more lenses, prisms, optical fiber bundle, holograms, or other transmissive optics instead of the mirror-based implementation of the embodiments described in FIGS. 3-5. Additionally or alternatively, the inverted image slicer 106 may be implemented using one or more additional components, such as gratings, deformable mirrors, adaptive optics, etc. It should be appreciated that the inverted image slicer 106 operates in a similar manner and with similar structure as an image slicer known in the art but in reverse (i.e., with input and output swapped). In the illustrative embodiment, the inverted image slicer 106 rearranges a field of view with a horizontal field of view that is 25 times that of the vertical field of view into an effective field of view of approximately equal fields of view in the horizontal and vertical directions by segmenting the field of view into five groups and rearranging them as shown in FIGS. 3-5. In some embodiments, the inverted image slicer 106 may rearrange a field of view into a different number of groups, such as 2-30 groups.

The interferometer 108 may be any suitable interferometer 108 capable of being used in a Fourier transform spectrometer. One embodiment of the interferometer 108 based on a Michelson interferometer is described in more detail below in regard to FIG. 6. In some embodiments, a different type of interferometer may be used, such as a Fabry-Perot interferometer, a Mach-Zehnder interferometer, a Sagnac interferometer, a static interferometer, a slit-based interferometer, etc.

In the illustrative embodiment, the image sensor 110 is a two-dimensional (2D) array of five by five pixels. Each pixel in the illustrative image sensor 110 corresponds to a field of view of approximately 20 milliradians. In other embodiments, the image sensor 110 may be any suitable array of pixels, such as an array of 2 to 10,000 pixels by 2 to 10,000 pixels. The field of view per pixel may be any suitable value, such as 0.1 microradians to 100 milliradians. The illustrative image sensor 110 is sensitive to light, such as infrared light from 600 $cm^{-1}$ to 2900 $cm^{-1}$ (i.e., about 3.5 micrometers to 16.5 micrometers). In the illustrative embodiment, the spectral resolution for the central pixel is 0.76 $cm^{-1}$ at a wavelength of 8 microns, and the spectral resolution for the pixel that is the farther off axis (i.e., the cornet pixels) is 0.96 $cm^{-1}$ at a wavelength of 8 microns. It should be appreciated that the spectral resolution may depend on the interferometer 108 discussed in more detail below as well as factors such as the wavelength of the light. The image sensor 110 may be sensitive to any suitable range of wavelengths, such as any range covering any part of the UV to far infrared (e.g., 300 nanometers to 100 micrometers). In some embodiments, the spectrometer 102 may include more than one sensor 110 that is sensitive to different wavelength ranges. The image sensor 110 may be embodied as a charge coupled device (CCD), a complementary metal-oxide semiconductor device (CMOS), a superconducting camera, or any other suitable light sensor. In some embodiments, the image sensor 110 may use narrow gap semiconductors, such as indium antimonide, indium arsenide, mercury cadmium telluride, lead sulfide, or lead selenide. In the illustrative embodiment, the image sensor 110 is actively or passively cooled, such as by using a heat sink, a peltier cooler, a Stirling engine cryocooler, etc. In some embodiments, the image sensor 110 may be on a translation stage.

The control circuitry 112 is configured to provide any necessary electrical control, processing, communication, etc., for the satellite 100 and/or the spectrometer 102. In the illustrative embodiment, the control circuitry 112 receives a signal from the image sensor 110. The control circuitry 112 may include a pre-amplifier and an analog-to-digital converter to convert the signal from the image sensor 110 to a digital signal. The control circuitry 112 may be configured to control and/or monitor the relative displacement of the two paths of the interferometer 108. It should be appreciated that signal from the image sensor 110 does not directly indicate the intensity for a given wavelength. Rather, the output from the image sensor 110 is in the form of an interferogram or interference pattern. In the illustrative embodiment, the control circuitry 112 performs the necessary analysis to transform the interferogram into a spectrum. Additionally or alternatively, the control circuitry 112 may transmit the data of the image sensor 110 to a ground station, which may perform the analysis to generate a spectrum.

The control circuitry 112 may be implemented as any suitable electronic device or set of devices capable of performing the function here. For example, the control circuitry 112 may be implemented as an application specific integrated circuit (ASIC), a system-on-a-chip (SoC), a field programmable gate array (FPGA), a processor-based computer, a multiprocessor system, and/or any other suitable electronic circuit. In some embodiments, some or all of the control circuitry 112 may be implemented as a processor, memory, and associated components. The processor may be embodied as a single or multi-core processor(s), a single or multi-socket processor, a digital signal processor, a microcontroller, or other processor or processing/controlling circuit. Similarly, the memory may be embodied as any type of volatile or non-volatile memory or data storage capable of performing the functions described herein. In operation, the memory may store various data and software used during operation of the control circuitry 112, such as operating systems, applications, programs, libraries, and drivers. The control circuitry 112 may include additional components such as data storage and communication circuitry. The data storage may be embodied as any type of device or devices configured for the short-term or long-term storage of data. For example, the data storage may include any one or more memory devices and circuits, memory cards, hard disk drives, solid-state drives, or other data storage devices. The communication circuitry may be embodied as any type of interface capable of communicating information to and/or from the satellite 100. The communication circuitry may include or be connected to one or more antennas. The communication circuitry may be capable of interfacing with any appropriate cable type, such as an electrical cable or an optical cable. The communication circuitry may be configured to use any one or more communication technology and associated protocols (e.g., Ethernet, Bluetooth®, Wi-Fi®, WiMAX, near field communication (NFC), Omni-Path, etc.). In the illustrative embodiment, conductive sinking is provided to allow the control circuitry 112 (and other electronics of the system) to operate in low pressure.

Although the illustrative spectrometer 102 is shown on a satellite 100, it should be appreciated that the spectrometer 102 may be used in other embodiments other than a satellite 100. For example, the spectrometer 102 may be used under an aircraft, used fixed over a conveyor belt, or used in any instance where a pushbroom interferometer would have a field of view that is too large for the desired spectral resolution.

Referring now to FIGS. 3-5, in one embodiment, components of the inverted image slicer 106 are shown. A lens 302 gathers incoming light. Light from the lens 302 reflects off of a pointing mirror 304 and is focused to an array of mirrors 306 (i.e., mirrors 306A-306E). Each of the illustrative mirrors 306A-306E is concave (to image aperture of lens 302 on each mirror of the array 308). In the illustrative embodiment, each of the mirrors 306A-306E is placed approximately one focal length away from the lens 302. Each of the mirrors 306A-306E directs incoming light to one of the array of mirrors 308 (i.e., mirrors 308A-308E). In particular, mirror 306A is configured to direct incoming light to mirror 308A, mirror 306B is configured to direct incoming light to mirror 308B, etc. Each mirror 308A-308E refocuses the light and directs it to another array of mirrors 310 (i.e., mirrors 310A-310E). In particular, mirror 308A is configured to direct incoming light to mirror 310A, mirror 308B is configured to direct incoming light to mirror 310B, etc. Each of the illustrative mirrors 310A-310E is concave (to image the aperture of the lens 302 on the lens 312). In the illustrative embodiment, each of the mirrors 308A-308E is a concave mirror that focuses the light. The focal length and placement of each of the mirrors 308A-308E is such that light that is focused at the surface of the mirrors 306A-306E is also focused at the surface of the mirrors 310A-310E. In particular, in the illustrative embodiment, each of the mirrors 308A-308E is placed two focal lengths away from the corresponding mirrors 306A-306E and 310A-310E. Each of mirrors 310A-310E is configured to reflect the incoming light towards the lens 312. The lens 312 is placed approximately one focal length away from the array of mirrors 310 to collimate the light. It should be appreciated that any rays that are incoming parallel to the gathering lens 302 are also parallel after passing through the lens 312, which is then suitable as an input to the interferometer (see FIG. 6). It should further be appreciated that, in the illustrative embodiment, the mirrors 306A-306E, 308A-308E, 310A-310E are configured such that any ray that passes through the center of the lens 302 also passes through the center of the lens 312. Additionally or alternatively, in some embodiments, the aperture of the lens 302 may be imaged on one or both of the mirrors of the interferometer 108, such that any ray that passes through the center of the lens 302 also reflects off of the center of the one or both mirrors of the interferometer 108.

It should be appreciated that a linear field of view of the spectrometer 102 is imaged at the array of mirrors 306. The linear field of view of divided into five groups, which are reorganized from a line at the array of mirrors 306 into a grid pattern at the array of mirrors 310.

Each of the mirrors and lenses shown in FIG. 3 may be any suitable mirrors and lenses. For example, the lenses 302, 312 may be, e.g., glass, fused silica, silicon, plastic, or any other suitable material. The mirrors 304, 306A-306E, 308A-308E, 310A-310E may be any suitable type of mirror, such as a substrate coated with, e.g., gold, aluminum, silver, copper, an interference coating, etc.

Referring now to FIG. 3, a path of one set of rays 314 through the inverted image slicer 106 are shown. The rays 314 correspond to three rays coming from the same direction (i.e., coming from the same point). The rays 314 include a left ray 314A, a principal ray 314B, and a right ray 314C. They rays 314 are all focused to the same point on the mirror 306B and directed to mirror 308B. Mirror 308B refocuses the rays 314 and directs them to mirror 310B. Mirror 310B then redirects the rays 314 towards the lens 312. It should be appreciated that mirror 310B directs the principal ray 314B through the center of the lens 312. It should further be appreciated that the rays 314 are spaced out in the horizontal direction when passing through lens 302 and are also spaced out in the horizontal direction when passing through lens 312. Of course, in use, additional rays parallel to the rays 314 may be included that are spaced out in the vertical direction as well.

Referring now to FIG. 4, a path of one set of rays 402 through the inverted image slicer 106 are shown. The rays 402 correspond to the principal rays passing through the center of lens 302 (and lens 312) for each of several points on the linear field of view of the satellite 100. In particular, rays 402 include ray 402A corresponding to the center ray of the first slice of the inverted image slicer 106, ray 402B corresponding to the center ray of the second slice of the inverted image slicer 106, etc. Each of the rays 402A-402E is focused onto the corresponding mirror 306A-306E. Each mirror 306A-306E directs the corresponding ray 402A-402E to corresponding mirror 308A-308E. Each mirror 308A-308E directs corresponding ray 402A-402E to corresponding mirror 310A-310E. Each mirror 310A-310E directs corresponding ray 402A-402E to the center of the lens 312. It should be appreciated that rays 402A-402E are initially spread out in different directions along the vertical plane when passing through lens 302 but are reorganized by the inverted image slicer 106 to be spread out in different directions along the horizontal plane when passing through lens 312.

Referring now to FIG. 5, a path of one set of rays 502 through the inverted image slicer 106 are shown. The rays 502 correspond to the principal rays passing through the center of lens 302 (and lens 312) for each of several points on the linear field of view of the satellite 100 of a single slice of the inverted image slicer 106. In particular, rays 502 include ray 502A corresponding to the principal ray of the lowermost point imaged on mirror 306B, ray 502B corresponding to the principal ray of the center point imaged on mirror 306B, and ray 502C corresponding to the principal ray of the uppermost point imaged on mirror 306B. Mirror 306B directs the rays 502A-502C to mirror 308B. Mirror 308B directs the rays 502A-502C to the mirror 310B. Mirror 310B directs each of the rays 502A-502C to the center of the lens 312. It should be appreciated that rays 502A-502C are initially spread out in different directions along the vertical plane when passing through lens 302 and are still spread out in different directions along the vertical plane when passing through lens 312.

Figure 6:
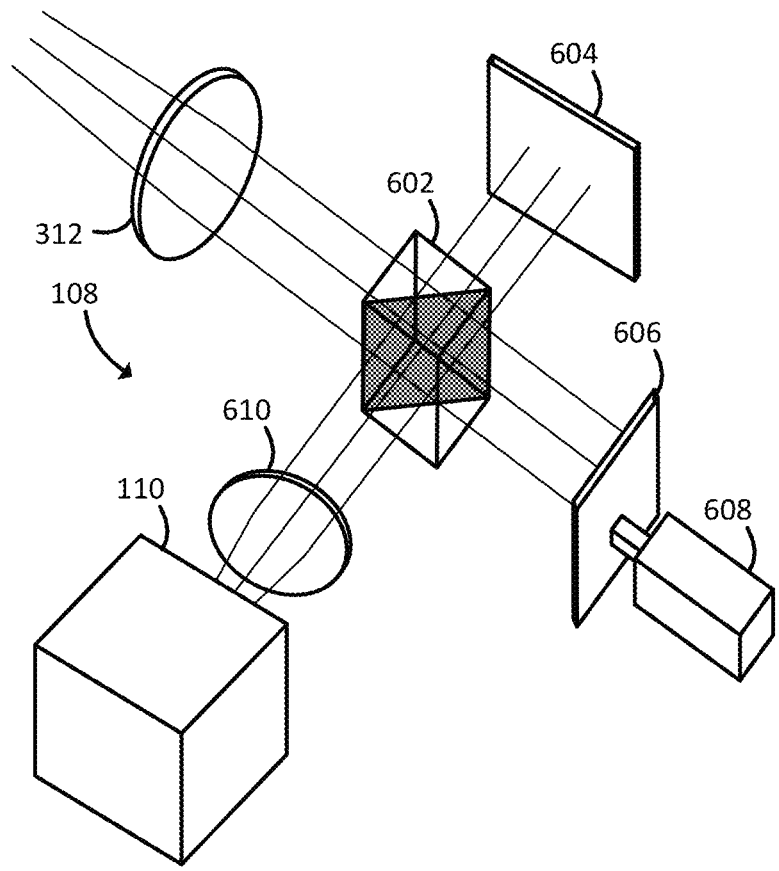
FIG. 6 is a simplified diagram of at least one embodiment of the interferometer of FIG. 1.

Referring now to FIG. 6, one embodiment of the interferometer 108 is shown. The interferometer includes a beam splitter 602, a mirror 604, a mirror 606, and an actuator 608. A lens 610 is also shown, which creates an image on the image sensor 110. The interferometer accepts light from the lens 312 of the inverted image slicer 106 (see FIGS. 3-5). The light is split into two paths at the beam splitter 602. The two paths are reflected by mirrors 604, 606 and recombined at the beam splitter 602, where the two paths interfere with each other. One of the interfered paths is focused by the lens 610 onto the sensor 110. The other interfered path is not used.

The beam splitter 602 may be embodied as any suitable component for splitting the incoming light into two or more paths. The beam splitter 602 may be embodied as a cube beam splitter, a plate beam splitter, a pellicle beam splitter, a polarizing beam splitter, a non-polarizing beam splitter, etc. The beam splitter 602 may be made of any suitable material, such as glass, fused silica, silicon, plastic, or any other suitable material. Each of the mirrors and lenses shown in FIG. 6 may be any suitable mirrors and lenses. For example, the lens 610 may be, e.g., glass, fused silica, silicon, plastic, or any other suitable material. The mirrors 604, 606 may be any suitable type of mirror, such as a substrate coated with, e.g., gold, aluminum, silver, copper, an interference coating, etc. In the illustrative embodiment, each of the mirrors 604, 606 is embodied as a corner-cube reflector. It should be appreciated that, in such an embodiment, the interferometer 108 may be less sensitive to rotations from the mirrors 604, 606. Additionally or alternatively, in some embodiments, one or both of the mirrors 604, 606 may be planar mirrors.

It should be appreciated that the resolution of the interferometer 108 may depend on the angle of the incoming light. In particular, light that is nearly on-axis may have a better spectral resolution, and light that is farther off-axis may have a worse spectral resolution. As a result, the transformation of the light at the gathering lens 302 from a wide, linear field of view to a grid field of view may improve the average resolution of the interferometer 108.

The actuator 608 is configured to move the mirror 606 along the principal axis of the light. The mirror 606 may be mounted on a translation stage (not shown) that interfaces with the actuator 608. The actuator 608 may be able to move any suitable distance, such as 0-10 millimeters close to or farther away from the beam splitter 602 relative to a balanced configuration. It should be appreciated that, in the illustrative embodiment, the optical path difference is twice the offset of the mirror 606 relative to a balanced configuration. In other embodiments, the optical path difference may be four or more times the offset of the mirror 606 relative to a balanced configuration. In the illustrative embodiment, the actuator 608 oscillates back and forth over an optical path difference of ±0.8 cm. In some embodiments, the actuator 608 may oscillate over a different optical path length, such as any suitable distance from several micrometers to several meters. The actuator may oscillate over any suitable period of time, such as 10 milliseconds to 10 hours. It should be appreciated that, in the illustrative embodiments, the center of the oscillation of the actuator 608 may be offset from the balanced configuration. For example, the actuator 608 may be offset by, e.g., 1-10,000 times the center wavelength of the light being detected. It should be appreciated that a higher offset can correspond to a higher resolution with a corresponding loss of spectral range.

Figure 7:
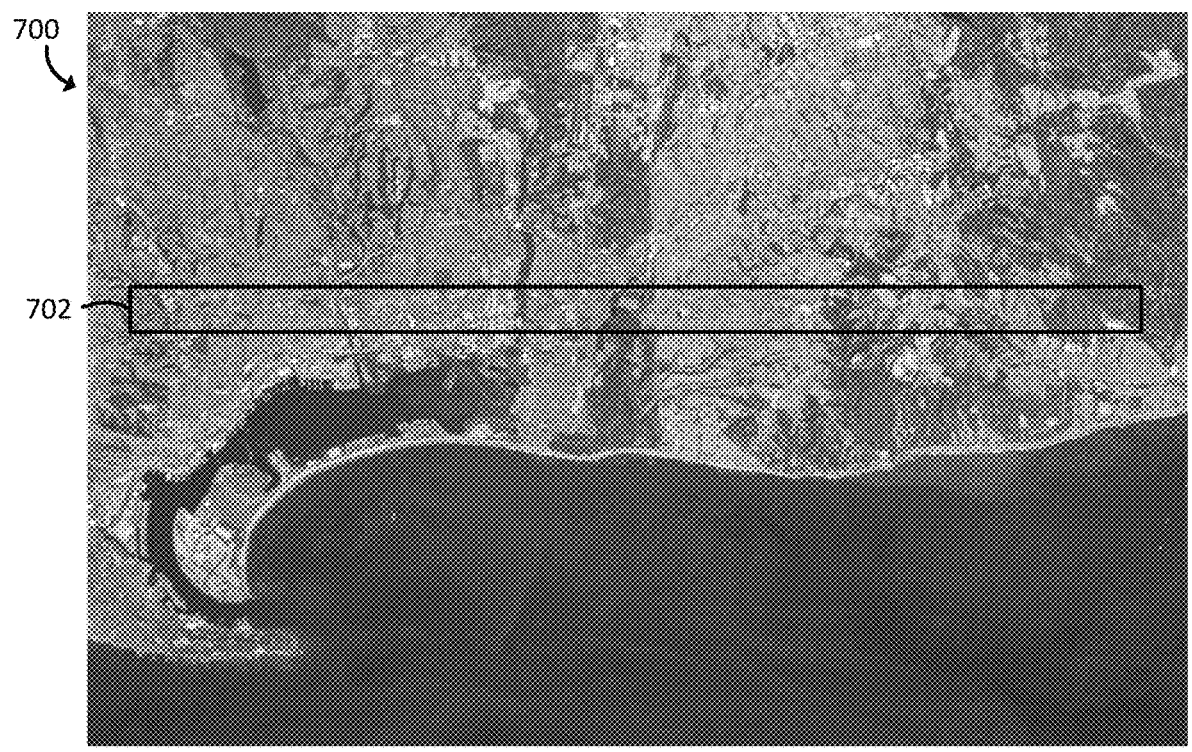
FIG. 7 is a picture with a field of view of the satellite of FIG. 1.
Figure 8:
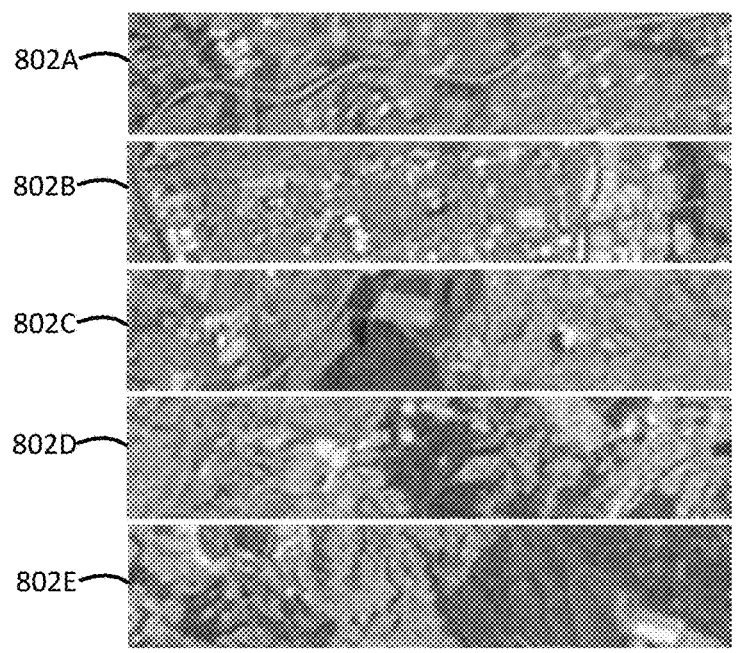
FIG. 8 is a picture of a field of view of the satellite of FIG. 1 rearranged by the inverted image slicer of FIG. 1.

Referring now to FIGS. 7 and 8, in one embodiment, a field of view 702 is shown in FIG. 7. The field of view 702 can be rearranged using the inverted image slicer 106, slicing the field of view into five smaller fields of view, 802A-802E. Fields of view 802A-802E are arranged to be stacked on top of each other, such that the image formed on the surface of the sensor is in an approximately square grid shape, as shown in FIG. 8.

The invention claimed is:

1. A spectrometer comprising:
an inverted image slicer configured to accept input light to the spectrometer;
an adjustable interferometer configured to accept light from the inverted image slicer;
a sensor configured to sense light from the interferometer;
wherein the inverted image slicer causes a linear field of view of the spectrometer to be imaged as a two-dimensional grid on the sensor.

2. The spectrometer of claim 1, wherein the sensor is configured to sense a range of wavelengths, wherein the range of wavelengths includes 6.2 micrometers.

3. The spectrometer of claim 2, wherein the sensor comprises a two-dimensional array of pixels, wherein data from each pixel of the two-dimensional array of pixels can be used to determine a spectrum of light imaged at that pixel with a resolution better than 2 cm$^{-1}$.

4. The spectrometer of claim 1, wherein the inverted image slicer converts a field of view with at least one dimension extending across at least 100 milliradians to a field of view with each dimension extending across less than 90 milliradians.

5. The spectrometer of claim 4, wherein the sensor comprises a two-dimensional array of pixels, wherein each pixel images a field of view between 0.005 and 30 milliradians.

6. The spectrometer of claim 1, wherein the inverted image slicer comprises:
a first lens to focus input light onto a first plurality of mirrors;
the first plurality of mirrors, wherein each of the first plurality of mirrors is tilted at an angle different from each other of the first plurality of mirrors, wherein each of the first plurality of mirrors is configured to direct light from the first lens to a corresponding mirror of a second plurality of mirrors;
the second plurality of mirrors, wherein each of the second plurality of mirrors is configured to direct light from the corresponding mirror of the first plurality of mirrors to a corresponding mirror of a third plurality of mirrors;
the third plurality of mirrors, wherein each of the third plurality of mirrors is tilted at an angle different from each other of the third plurality of mirrors, wherein each of the third plurality of mirrors is configured to direct light from a corresponding mirror of the second plurality of mirrors to a second lens; and
the second lens.

7. The spectrometer of claim 6, wherein each of the second plurality of mirrors is configured to image a surface of the corresponding mirror of the first plurality of mirrors on a surface of the corresponding mirror of the second plurality of mirrors.

8. The spectrometer of claim 1, wherein the interferometer comprises a beam splitter, a first mirror, and a second mirror, wherein each of the first mirror and the second mirror is a corner-cube mirror.

9. The spectrometer of claim 1, wherein the interferometer is in a Michelson configuration.

10. A satellite comprising the spectrometer of claim 1.

11. A method of using a spectrometer, the method comprising:
gathering light into an inverted image slicer, the inverted image slicer configured to accept input light to the spectrometer;
transmitting light from the inverted image slicer to an adjustable interferometer; and
detecting light from the adjustable interferometer at a sensor,
wherein the inverted image slicer causes a linear field of view of the spectrometer to be imaged as a two-dimensional grid on the sensor.

12. The method of claim 11, further comprising analyzing data from the sensor to determine a spectrum of the gathered light.

13. The method of claim 12, further comprising predicting the weather based on the spectrum of the gathered light.

14. The method of claim 11, wherein the sensor is configured to sense a range of wavelengths, wherein the range of wavelengths includes 6.2 micrometers.

15. The method of claim 14, wherein the sensor comprises a two-dimensional array of pixels, wherein data from each pixel of the two-dimensional array of pixels can be used to determine a spectrum of light imaged at that pixel with a resolution better than 2 cm$^{-1}$.

16. The method of claim 11, wherein the inverted image slicer converts a field of view with at least one dimension extending across at least 100 milliradians to a field of view with each dimension extending across less than 90 milliradians.

17. The method of claim 11, wherein the inverted image slicer comprises:
- a first lens to focus input light onto a first plurality of mirrors;
- the first plurality of mirrors, wherein each of the first plurality of mirrors is tilted at an angle different from each other of the first plurality of mirrors, wherein each of the first plurality of mirrors is configured to direct light from the first lens to a corresponding mirror of a second plurality of mirrors;
- the second plurality of mirrors, wherein each of the second plurality of mirrors is configured to direct light from the corresponding mirror of the first plurality of mirrors to a corresponding mirror of a third plurality of mirrors;
- the third plurality of mirrors, wherein each of the third plurality of mirrors is tilted at an angle different from each other of the third plurality of mirrors, wherein each of the third plurality of mirrors is configured to direct light from a corresponding mirror of the second plurality of mirrors to a second lens; and
- the second lens.

18. The method of claim 17, wherein each of the second plurality of mirrors is configured to image a surface of the corresponding mirror of the first plurality of mirrors on a surface of the corresponding mirror of the second plurality of mirrors.

19. The method of claim 11, wherein the interferometer comprises a beam splitter, a first mirror, and a second mirror, wherein each of the first mirror and the second mirror is a corner-cube mirror.

20. The method of claim 11, wherein the spectrometer is on a satellite orbiting Earth.

* * * * *